(12) United States Patent
Carter et al.

(10) Patent No.: US 11,745,289 B2
(45) Date of Patent: Sep. 5, 2023

(54) ADDITIVE MANUFACTURING SYSTEMS AND METHODS INCLUDING ROTATING BUILD PLATFORM

(71) Applicant: General Electric Company, Schenectady, NY (US)

(72) Inventors: William Thomas Carter, Galway, NY (US); Pawan Sudhindra Rao, West Lafayette, IN (US); Christopher James Hayden, Niskayuna, NY (US); Michael Robert Tucker, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 696 days.

(21) Appl. No.: 16/282,173

(22) Filed: Feb. 21, 2019

(65) Prior Publication Data

US 2020/0269353 A1 Aug. 27, 2020

(51) Int. Cl.
*B23K 26/14* (2014.01)
*B33Y 10/00* (2015.01)
(Continued)

(52) U.S. Cl.
CPC ............ *B23K 26/14* (2013.01); *B22F 10/322* (2021.01); *B22F 12/226* (2021.01); *B22F 12/37* (2021.01); *B22F 12/52* (2021.01); *B22F 12/67* (2021.01); *B22F 12/70* (2021.01); *B23K 26/0823* (2013.01); *B23K 26/1464* (2013.01); *B23K 26/342* (2015.10); *B23K 26/702* (2015.10);
(Continued)

(58) Field of Classification Search
CPC .... B33Y 30/00; B23K 26/342; B23K 10/027; B23K 9/044; B23K 26/0823
See application file for complete search history.

(56) References Cited

U.S. PATENT DOCUMENTS 7,037,382 B2 * 5/2006 Davidson ............... B29C 41/12
134/198
8,017,055 B2 9/2011 Davidson et al.
(Continued)

FOREIGN PATENT DOCUMENTS

CN 204736450 U 11/2015
CN 206718485 U 12/2017
(Continued)

OTHER PUBLICATIONS

Cecala et al., Dust Control Handbook for Industrial Minerals Mining and Processing RI 9689 Report of Investigations/2012, Chapter 5 (Year: 2012).*
(Continued)

*Primary Examiner* — Justin C Dodson
*Assistant Examiner* — Fahmida Ferdousi
(74) *Attorney, Agent, or Firm* — Dority & Manning, P.A.

(57) ABSTRACT

An additive manufacturing system may include a build platform configured to receive a particulate, a particulate dispenser configured to deposit the particulate onto said build platform, a consolidation device configured to consolidate at least a portion of the particulate to form a component, a first actuator assembly configured to rotate said build platform about a rotation axis at a first speed, and a second actuator assembly configured to rotate said shaft about the rotation axis at a second speed different from the first speed.

20 Claims, 10 Drawing Sheets

(51) Int. Cl.
*B33Y 30/00* (2015.01)
*B33Y 40/00* (2020.01)
*B33Y 50/02* (2015.01)
*B23K 26/342* (2014.01)
*B23K 26/70* (2014.01)
*B23K 26/08* (2014.01)
*B22F 12/00* (2021.01)
*B22F 12/37* (2021.01)
*B22F 12/52* (2021.01)
*B22F 12/67* (2021.01)
*B22F 12/70* (2021.01)
*B22F 10/322* (2021.01)
*B22F 10/25* (2021.01)
*B22F 10/28* (2021.01)
*B22F 10/77* (2021.01)

(52) U.S. Cl.
CPC ............... *B33Y 10/00* (2014.12); *B33Y 30/00* (2014.12); *B33Y 40/00* (2014.12); *B33Y 50/02* (2014.12); *B22F 10/25* (2021.01); *B22F 10/28* (2021.01); *B22F 10/77* (2021.01)

(56) References Cited

U.S. PATENT DOCUMENTS

| | | | |
|---|---|---|---|
| 8,567,279 B2 * | 10/2013 | Seto | F16H 25/2252 74/424.91 |
| 9,073,264 B2 | 7/2015 | Abe et al. | |
| 2008/0109102 A1 * | 5/2008 | Sutcliffe | B29C 64/165 700/119 |
| 2008/0317951 A1 | 12/2008 | Green | |
| 2016/0167160 A1 | 6/2016 | Hellestam | |
| 2017/0028472 A1 | 2/2017 | Shaw et al. | |
| 2017/0252806 A1 * | 9/2017 | Wienberg | B23K 26/0853 |
| 2017/0304894 A1 | 10/2017 | Buller | |
| 2017/0314894 A1 * | 11/2017 | Tunis, III | F41H 5/0478 |
| 2018/0161925 A1 | 6/2018 | Harding | |
| 2018/0169970 A1 | 6/2018 | Harding et al. | |
| 2018/0345379 A1 | 12/2018 | Holford et al. | |
| 2018/0345600 A1 | 12/2018 | Holford et al. | |
| 2019/0160749 A1 * | 5/2019 | Hellestam | B29C 64/153 |
| 2020/0139626 A1 * | 5/2020 | Pan | B22F 10/20 |

FOREIGN PATENT DOCUMENTS

DE  102013210242 A1  12/2014
WO  WO-2014195068 A1 * 12/2014 ............ B22F 3/1055

OTHER PUBLICATIONS

DataGenetics website, 2018 (Year: 2018).*
Thomasnet website, 2018 (Year: 2018).*
Homeguides website, 2018 (Year: 2018).*
3D Metal Droplet Printing Development and Advanced Materials Additive Manufacturing, E. Murr, et al., J Mater Res Technol, 2017; 6(1): 77-89.

* cited by examiner

ADDITIVE MANUFACTURING SYSTEMS AND METHODS INCLUDING ROTATING BUILD PLATFORM

BACKGROUND

The subject matter described herein relates generally to additive manufacturing systems and, more particularly, to additive manufacturing systems including a rotating build platform.

At least some known additive manufacturing systems involve the consolidation of a particulate to fabricate a component. Such techniques facilitate producing complex components from expensive materials at a reduced cost and with improved manufacturing efficiency. At least some known additive manufacturing systems, such as Direct Metal Laser Melting (DMLM), Selective Laser Melting (SLM), Direct Metal Laser Sintering (DMLS), and Laser-CUSING® systems, fabricate components using a focused energy source, such as a laser device or an electron beam generator, a build platform, and a particulate, such as, without limitation, a powdered metal. (LaserCUSING is a registered trademark of Concept Laser GmbH of Lichtenfels, Germany.)

In at least some additive manufacturing systems, a plurality of linear and rotary actuators are used to move the build platform in different directions during fabrication of the component. Each actuator is separately controlled and the separate movements of the actuators must be precisely coordinated to properly fabricate the component on the build platform. As a result, the costs to construct, operate, and maintain the additive manufacturing systems are increased. In addition, the time required for fabricating the component is dependent on the speed of each actuator and the processing speed of the controller required to coordinate movement of the actuators.

In addition, in at least some known additive manufacturing systems, a recoater is used to distribute the particulate on the build platform. For example, in some embodiments, a recoater moves the particulate from a container onto and across the build platform. The recoater and the focused energy source are operated at separate times, because the focused energy source cannot consolidate the particulate while the recoater is spreading the particulate. As a result, the time required for fabricating the components is increased to accommodate sequential operation of the recoater and the focused energy source.

Accordingly, there is a need for an improved additive manufacturing system including a rotating build platform that allows for fabrication of a component in a reduced time.

BRIEF DESCRIPTION

In one aspect, an additive manufacturing system is provided. The additive manufacturing system includes a build platform configured to receive a particulate, a particulate dispenser configured to deposit the particulate onto the build platform, and a consolidation device configured to consolidate at least a portion of the particulate to form a component. The additive manufacturing system also includes a first actuator assembly configured to rotate the build platform about a rotation axis at a first speed. The rotation axis extends through a center of the build platform. The additive manufacturing system further includes a second actuator assembly including an actuator and a shaft extending along the rotation axis. The actuator is configured to rotate the shaft about the rotation axis at a second speed different from the first speed. The shaft is coupled to the build platform and configured to translate the build platform along the rotation axis upon rotation of the shaft.

In another aspect, a method of fabricating a component using an additive manufacturing system is provided. The method includes rotating a build platform about a rotation axis at a first speed using a first actuator assembly. The rotation axis extends through a center of the build platform. The method further includes rotating a shaft about the rotation axis at a second speed different from the first speed using a second actuator assembly. The shaft extends along the rotation axis and is coupled to the build platform to translate the build platform along the rotation axis upon rotation of the shaft. The method further includes depositing a particulate onto the build platform and consolidating at least a portion of the particulate using a consolidation device. The method also includes adjusting at least one of the first speed and the second speed based on a characteristic of the component and an operating parameter of the consolidation device.

In yet another aspect, an additive manufacturing system is provided. The additive manufacturing system includes a build platform configured to receive a particulate. The additive manufacturing system also includes a particulate dispenser configured to deposit the particulate onto a central region of the build platform. The additive manufacturing system further includes a first actuator assembly configured to rotate the build platform about a rotation axis. The rotation axis extends through a center of the build platform. The additive manufacturing system also includes a second actuator assembly configured to translate the build platform along the rotation axis. The additive manufacturing system further includes at least one recoater blade positionable adjacent the build platform. The recoater blade is fixed in position during rotation of the build platform and is configured to contact the particulate deposited on the central region of the build platform and distribute the particulate across the build platform. The additive manufacturing system also includes at least one consolidation device configured to consolidate at least a portion of the particulate to form a component as the at least one recoater blade distributes the particulate.

DRAWINGS

These and other features, aspects, and advantages of the present disclosure will become better understood when the following detailed description is read with reference to the accompanying drawings in which like characters represent like parts throughout the drawings, wherein.

Figure 1:
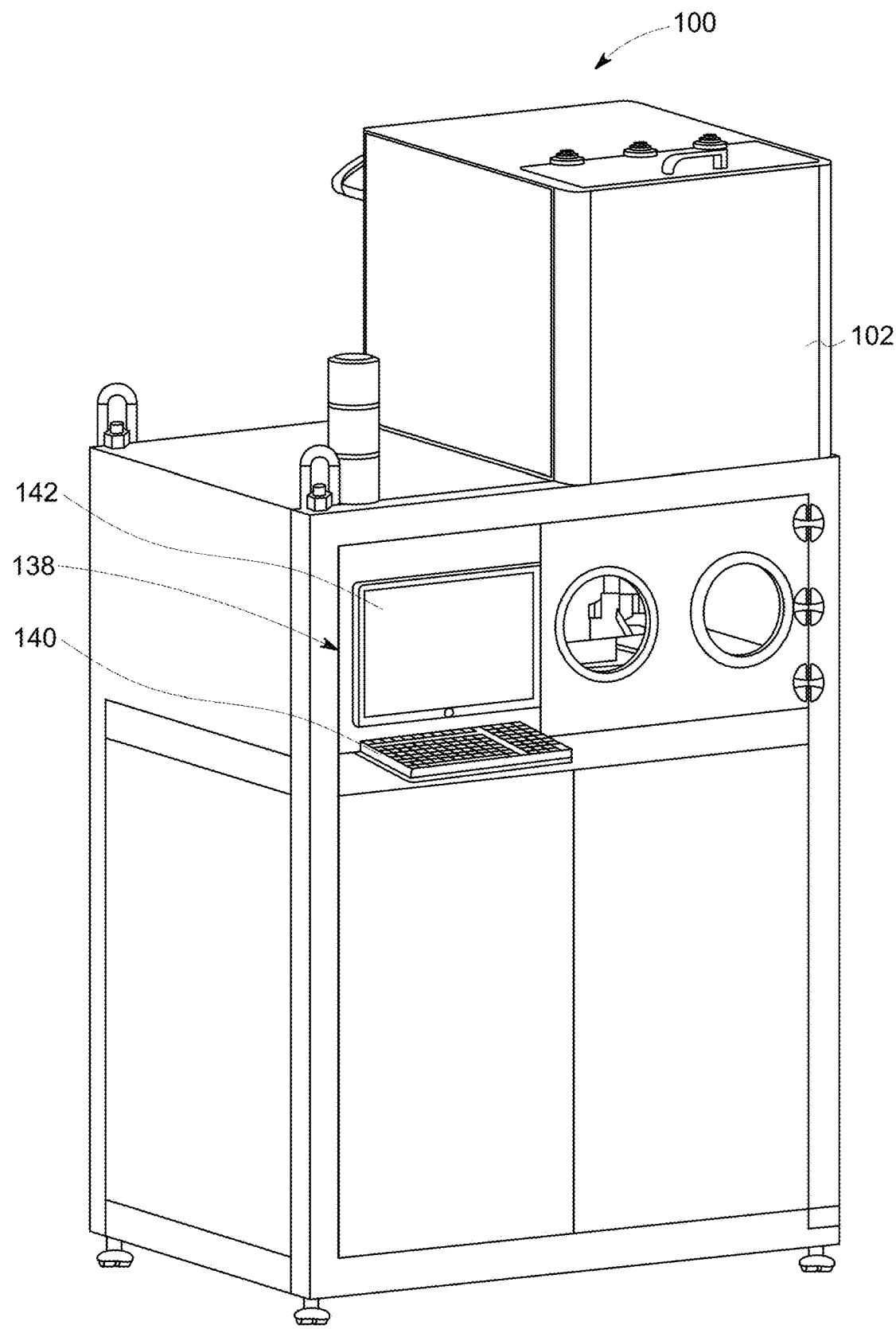
FIG. 1 is a perspective view of an exemplary additive manufacturing system including a rotating build platform.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling ProJet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

The systems and methods described herein include an additive manufacturing system including a rotating build platform. The build platform is rotated at a first speed about a rotational axis using a first actuator assembly. The additive manufacturing system further includes a shaft that is rotated about the rotational axis at a second speed different from the first speed using a second actuator assembly. The shaft is coupled to the build platform such that the difference in speed between the build platform and the shaft induces linear movement of the build platform along the rotational axis. In some embodiments, a particulate is deposited onto a central region of the build platform and a recoater assembly contacts the particulate to distribute the particulate across the build platform as the build platform rotates. As a result, the time required to fabricate components using the additive manufacturing system described herein is reduced in comparison to at least some known additive manufacturing systems.

Figure 2:
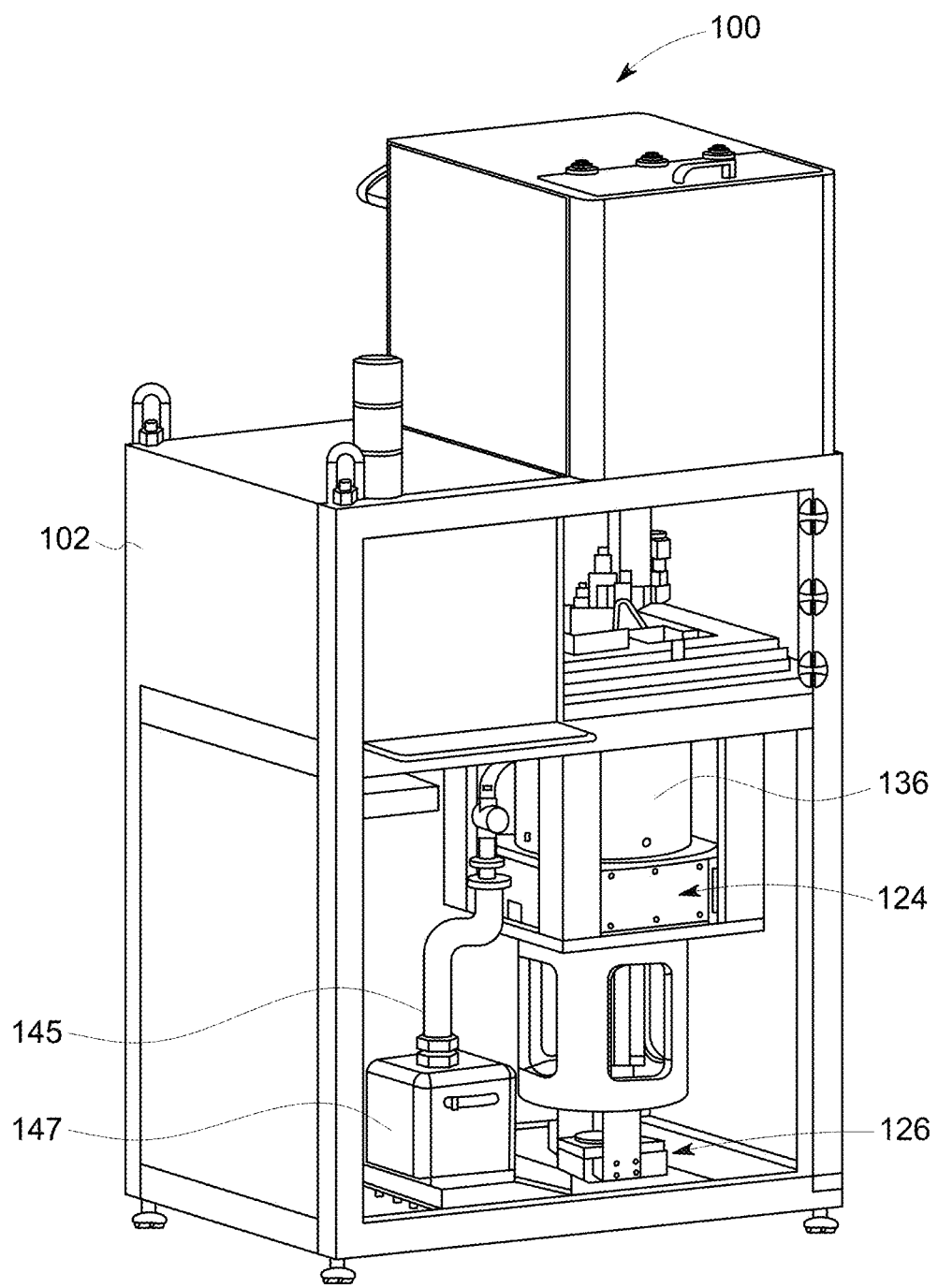
FIG. 2 is a perspective view of the additive manufacturing system shown in FIG. 1 with a portion of a housing removed to show the rotating build platform and at least one actuator assembly.
Figure 3:
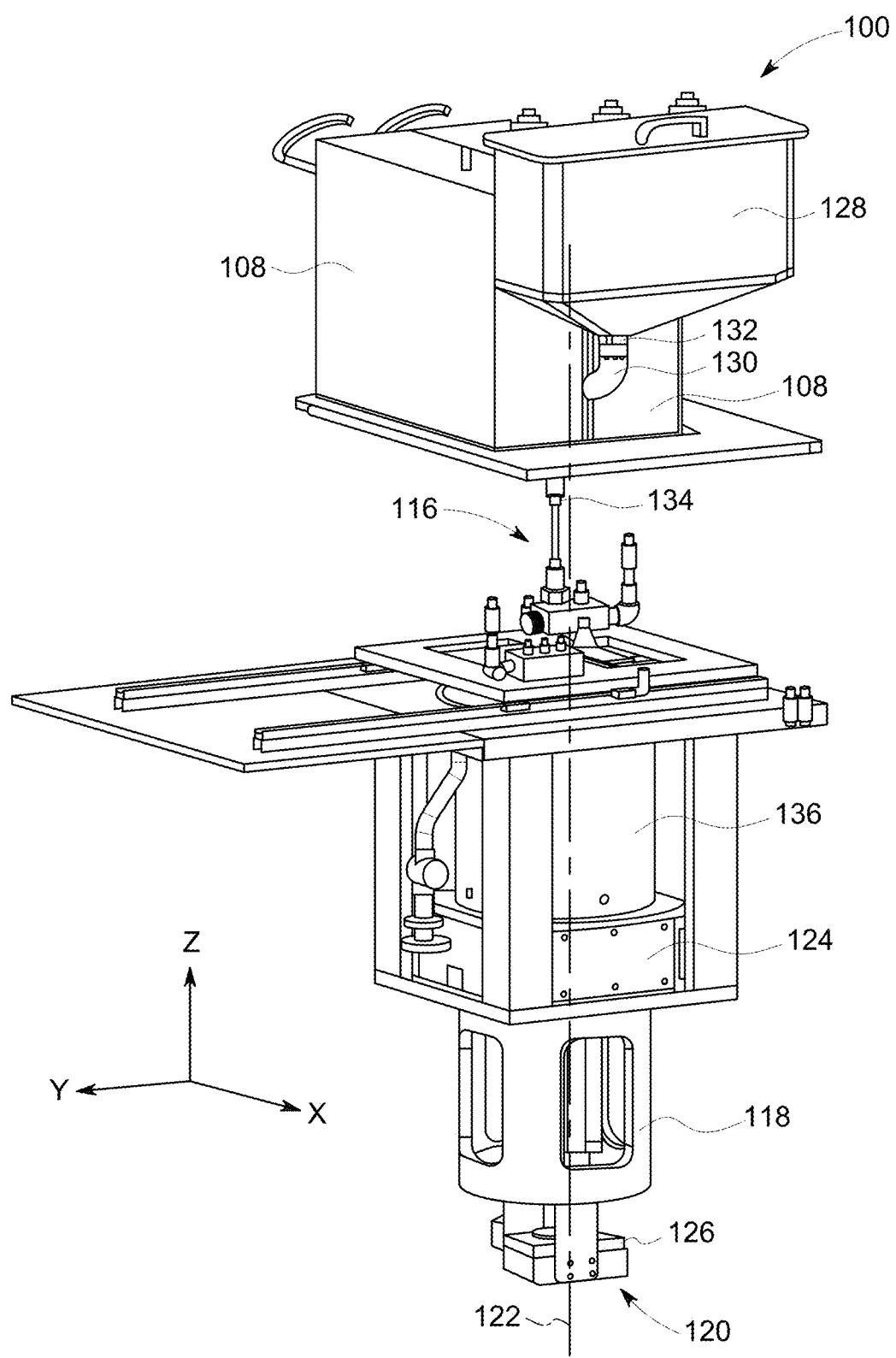
FIG. 3 is a perspective view of a portion of the additive manufacturing system shown in FIGS. 1 and 2.
Figure 4:
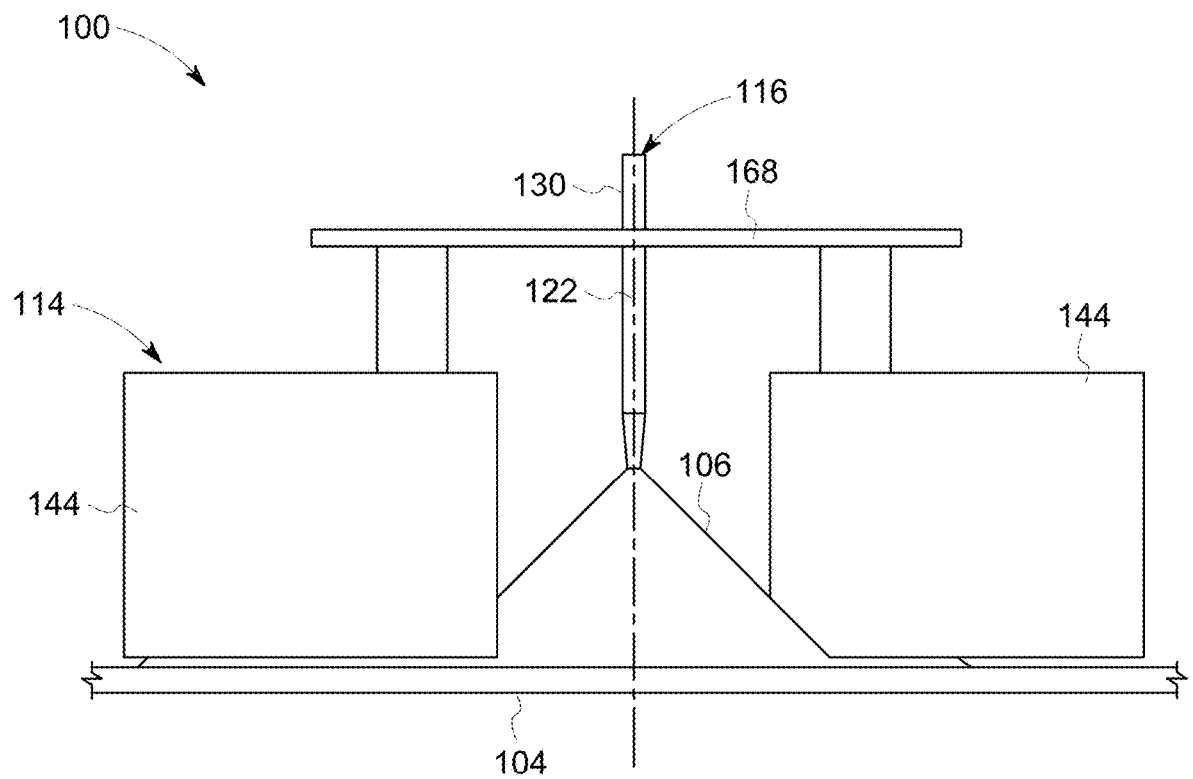
FIG. 4 is a schematic view of a particulate deposited onto the rotating build platform of the additive manufacturing system shown in FIGS. 1 and 2.

FIG. 1 is a perspective view of an exemplary additive manufacturing system 100. FIG. 2 is a perspective view of additive manufacturing system 100 with a portion of a housing 102 removed to show a build platform 104 and at least one actuator assembly. FIG. 3 is a perspective view of a portion of additive manufacturing system 100. FIG. 4 is a schematic view of a particulate 106 deposited onto build platform 104 of additive manufacturing system 100. A coordinate system of additive manufacturing system 100 includes an X-axis, a Y-axis, and a Z-axis. Additive manufacturing system 100 builds objects, for example, a part or component (not shown). In the exemplary embodiment, additive manufacturing system 100 includes at least one consolidation device 108. For example, in some embodiments, consolidation device 108 includes a laser device and a scanning device. Additive manufacturing system 100 is configured for fabricating a component using a layer-by-layer manufacturing process by sintering or melting particulate 106 using an energy beam generated by a source such as a laser device. For example, in some embodiments, additive manufacturing system 100 is used for direct metal laser sintering (DMLS) or direct metal laser melting (DMLM). Consolidation device 108 includes a laser that provides a high-intensity heat source configured to generate a melt pool in a bed of particulate 106 using an energy beam. Alternatively, consolidation device 108 may include any component that facilitates consolidation of a material using any of the processes and systems described herein.

In the exemplary embodiment, additive manufacturing system 100 further includes a recoater assembly 114 and a particulate dispenser 116. During operation of additive manufacturing system 100, particulate 106 is supplied by particulate dispenser 116 and spread evenly over build platform 104 using recoater assembly 114. Recoater assembly 114 is configured to maintain particulate 106 at a predetermined particulate level and facilitate removal of excess particulate material. Consolidation devices 108 consolidate a first portion of particulate 106 to form a cross sectional layer of component. Recoater assembly 114 and consolidation devices 108 are able to operate simultaneously to distribute and consolidate particulate 106 because recoater assembly 114 and consolidation device 108 operate on different regions of build platform 104. During selective consolidation of the layer of particulate 106, build platform 104 is lowered as particulate 106 is spread over build platform 104 and the partial component to allow continuous consolidation of particulate 106 by consolidation devices 108. The process is continued until the component is completely built up from the consolidated portion of particulate 106.

Also, in the exemplary embodiment, build platform 104 is mounted to a support structure 118 and is moved by an actuator system 120. Actuator system 120 is configured to rotate build platform 104 about a rotation axis 122 and move build platform 104 in the Z-direction (i.e., normal to a top surface of build platform 104). In the exemplary embodiment, actuator system 120 includes a first actuator assembly 124 and a second actuator assembly 126. Each actuator assembly 124, 126 includes, for example and without limitation, a linear motor(s), a hydraulic and/or pneumatic piston(s), a screw drive mechanism(s), rotational stages, and/or a conveyor system. In alternative embodiments, additive manufacturing system 100 includes any actuator system 120 that enables additive manufacturing system 100 to operate as described herein.

In addition, in the exemplary embodiment, particulate dispenser 116 includes a hopper or reservoir 128, a conduit 130 coupled to an outlet 132 of hopper 128, and a valve 134 configured to regulate flow of the particulate from hopper 128 and through conduit 130. In the exemplary embodiment, hopper 128 and conduit 130 are positioned above build platform 104 and particulate 106 is gravity fed (i.e., particulate flows due to the force of gravity and particulate dispenser 116 does not include any flow-inducing mechanisms) from hopper 128 through conduit 130 onto build platform 104. In some embodiments, a sensor (not shown) such as a weight scale provides feedback for use in controlling particulate dispenser 116. For example, particulate dispenser 116 may be controlled to provide appropriate feed rates of particulate 106 to build platform 104 and regulate the amount of particulate 106 on build platform 104. In alternative embodiments, additive manufacturing system 100 includes any particulate dispenser 116 that enables particulate dispenser 116 to operate as described herein.

Moreover, in the exemplary embodiment, additive manufacturing system 100 further includes a wall 136 extending around build platform 104 to define a build container. In the exemplary embodiment, build platform 104 is generally circular. Wall 136 is generally cylindrical and fully surrounds particulate 106 on build platform 104. In alternative embodiments, build platform 104 and/or wall 136 may be any shapes that facilitate operation of additive manufacturing system 100 as described herein. In further embodiments, wall 136 may surround a portion of particulate 106 and/or may be coupled to any other wall or component that facilitates operation of additive manufacturing system 100 as described herein. In addition, in some embodiments, additive manufacturing system 100 includes an inner particulate containment wall (not shown) that reduces the amount of particulate 106 required to assemble the component. The inner particulate containment wall may be cylindrical. In embodiments including an inner particulate containment wall, particulate 106 may be dispensed adjacent the inner particulate containment wall and consolidated to form a shape such as a pipe shape having a cavity near the central region of build platform 104.

Also, in the exemplary embodiment, additive manufacturing system 100 includes a plurality of consolidation devices 108. Each consolidation device 108 is configured to consolidate particulate 106 on a different area of build platform 104. Build platform 104 is able to rotate at an increased speed during fabrication of a component because two or more consolidation devices 108 are used to consolidate particulate 106. In alternative embodiments, additive manufacturing system 100 includes any number of consolidation devices 108 including a single consolidation device 108.

Moreover, in the exemplary embodiment, additive manufacturing system 100 includes a computer control system, or controller 138. Controller 138 includes a processor (not shown), a memory (not shown), and a user interface including an input device 140 and a display 142. Controller 138 controls operation of consolidation device 108 to facilitate directing an energy beam along the surface of particulate 106 of a build layer to form a layer of component within wall 136. For example, a scanning device of consolidation device 108 is controlled by controller 138 and is configured to move a mirror, or series of mirrors, such that the energy beam is reflected to be incident along a predetermined scan path along build platform 104, such as, for example, and without limitation, a linear, rotation, and/or asymmetric scan path. In some embodiments, consolidation device 108 includes a two-dimensional scan galvanometer, a three-dimensional (3D) scan galvanometer, dynamic focusing galvanometer, and/or any other scanning device that may be used to deflect an energy beam of consolidation device 108. In alternative embodiments, the energy beam is moved in any orientation and manner that enables additive manufacturing system 100 to operate as described herein.

In the exemplary embodiment, additive manufacturing system 100 is operated to fabricate a component from a computer modeled representation of the 3D geometry of the component. The computer modeled representation may be produced in a computer aided design (CAD) or similar file. The CAD file of the component is converted into a layer-by-layer format that includes a plurality of build parameters for each layer of the component. For example, a build layer of the component includes a particulate to be consolidated by additive manufacturing system 100. In the exemplary embodiment, the component is modeled in a desired orientation relative to the origin of the coordinate system used in additive manufacturing system 100. The geometry of the component is sliced into a stack of layers of a desired thickness, such that the geometry of each layer is an outline of the cross-section through the component at that particular layer location. Scan paths are generated across the geometry of a respective layer. The build parameters are applied along each scan path to fabricate that layer of the component from particulate 106 used to construct the component. The steps are repeated for each respective layer of component geometry. Once the process is completed, an electronic computer build file (or files) is generated, including all of the layers. The build file is loaded into controller 138 of additive manufacturing system 100 to control the system during fabrication of each layer.

After the build file is loaded into controller 138, additive manufacturing system 100 is operated to generate the component by implementing the layer-by-layer manufacturing process, such as a direct metal laser melting method. The exemplary layer-by-layer additive manufacturing process does not use a pre-existing article as the precursor to the final component, rather the process produces components from a raw material in a configurable form, such as particulate 106. For example, and without limitation, a steel component can be additively manufactured using a steel powder. Additive manufacturing system 100 enables fabrication of components using a broad range of materials, for example, and without limitation, metals, ceramics, glass, and polymers.

With particular reference to FIG. 4, in the exemplary embodiment, conduit 130 of particulate dispenser 116 is positioned to deposit particulate 106 onto a central region of build platform 104. In addition, conduit 130 is positioned a vertical distance from build platform 104 such that particulate 106 forms a conical shape on the central region of build platform 104. The side of the conical shape is sloped at an angle defined by the angle of repose of particulate 106. As particulate dispenser 116 deposits particulate 106 onto the central region of build platform 104, the conical shape of particulate 106 expands radially outward from the center of build platform 104. In the exemplary embodiment, conduit 130 is positioned substantially above a center of build platform where the relative velocity between conduit 130 and build platform 104 is substantially zero, i.e., a dead zone on build platform 104. The velocity of build platform 104 relative to conduit 130 increases as the radial distance from the center increases. In alternative embodiments, particulate 106 is deposited onto build platform 104 in any manner that enables additive manufacturing system 100 to operate as described herein.

Also, in the exemplary embodiment, at least one blade 144 of recoater assembly 114 is positioned to contact the outer portion of the conical shape of particulate 106 and distribute particulate 106 across build platform 104. For example, recoater blade 144 may extend along a chord of build platform 104, i.e., a line extending through a circular perimeter of build platform without extending through the center of build platform 104, and partially into the central portion of build platform 104. In the exemplary embodiment, recoater blade 144 is stationary as build platform 104 rotates. The conical shape of particulate 106 extends throughout and possibly beyond the central region of build platform 104. As a result, recoater blade 144 contacts particulate 106 and directs particulate 106 along the length of recoater blade 144 across build platform 104 when build platform 104 rotates. In addition, recoater assembly 114 maintains a uniform thickness of each layer of particulate 106 on build platform 104 above the prior consolidated layer. In some embodiments, each layer has a thickness in a range of about 10 microns to about 200 microns. In alternative embodiments, recoater assembly 114 includes any recoater blade 144 that enables additive manufacturing system 100 to operate as described herein.

In addition, in the exemplary embodiment, excess particulate 106 from build platform 104 is transferred through a conduit 145 into a hopper 147 where particulate 106 is collected. In some embodiments, the collected particulate 106 may be processed and/or used to fabricate a subsequent component. Excess particulate 106 is removed from build platform 104 as described further with reference to FIGS. 5 and 6. In alternative embodiments, excess particulate 106 is handled in any manner that enables additive manufacturing system 100 to operate as described herein.

Figure 5:
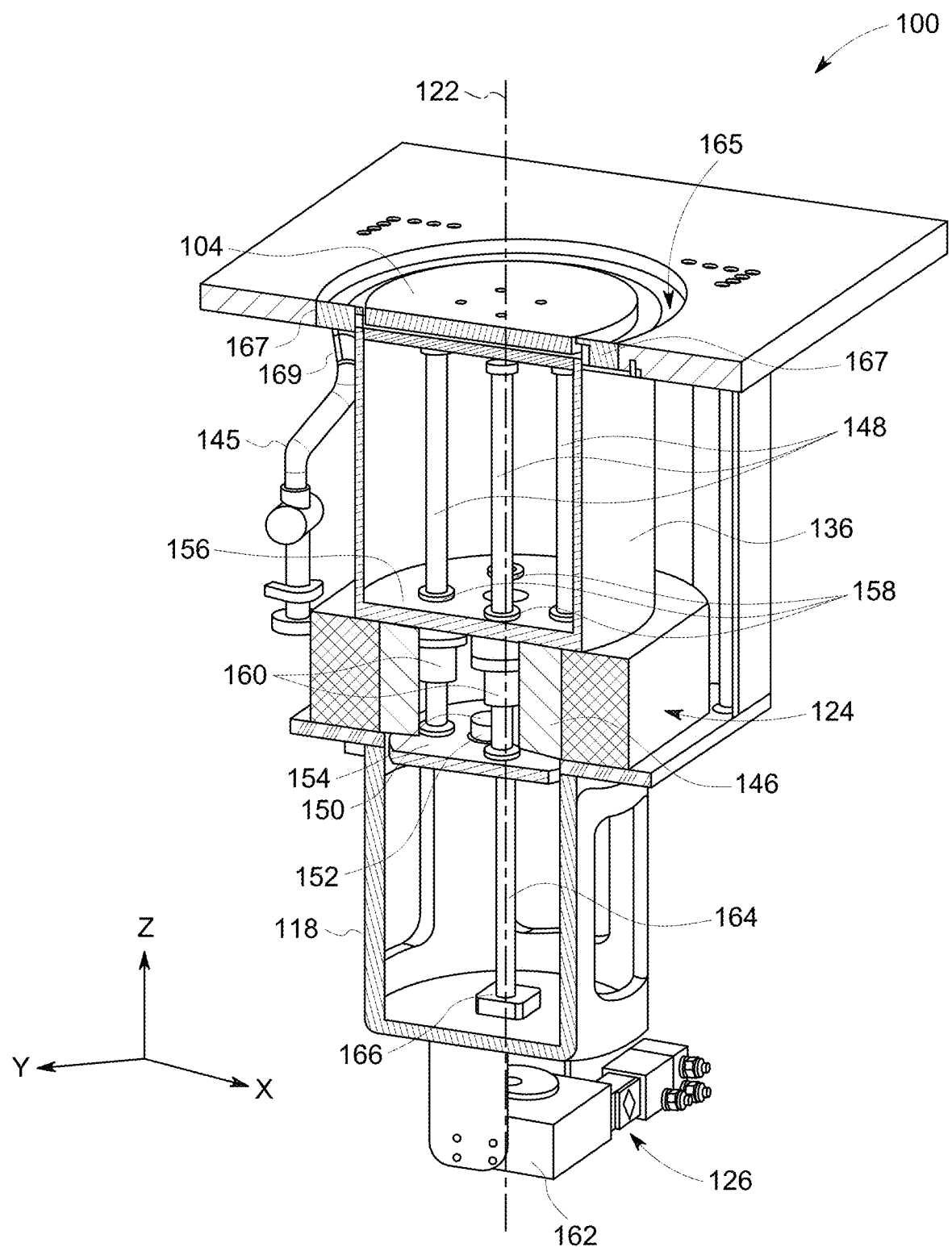
FIG. 5 is a sectional view of a portion of the additive manufacturing system shown in FIGS. 1 and 2 with the rotating build platform in a first position.
Figure 6:
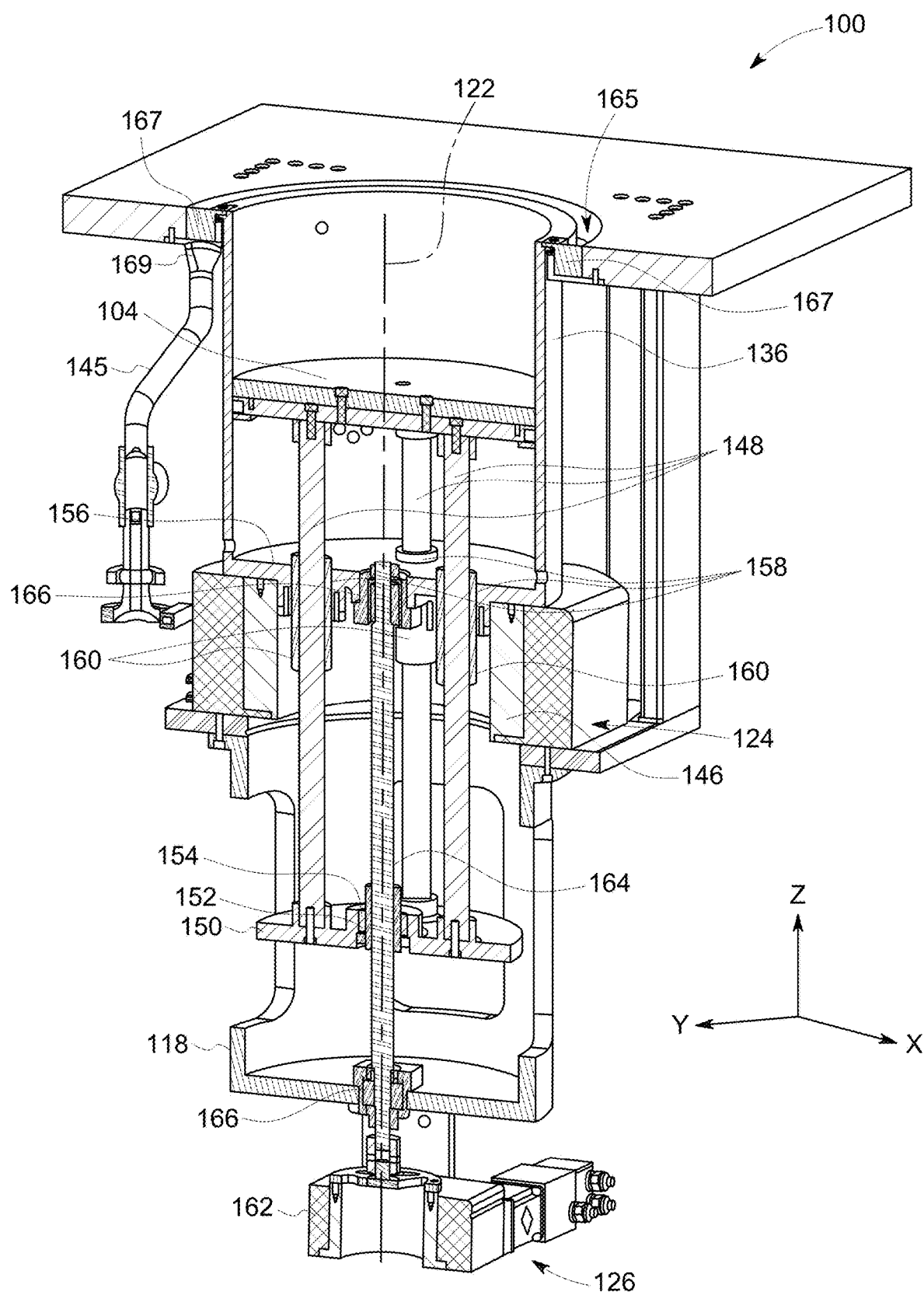
FIG. 6 is a sectional perspective view of a portion of the additive manufacturing system shown in FIGS. 1 and 2 with the rotating build platform in a second position.
Figure 7:
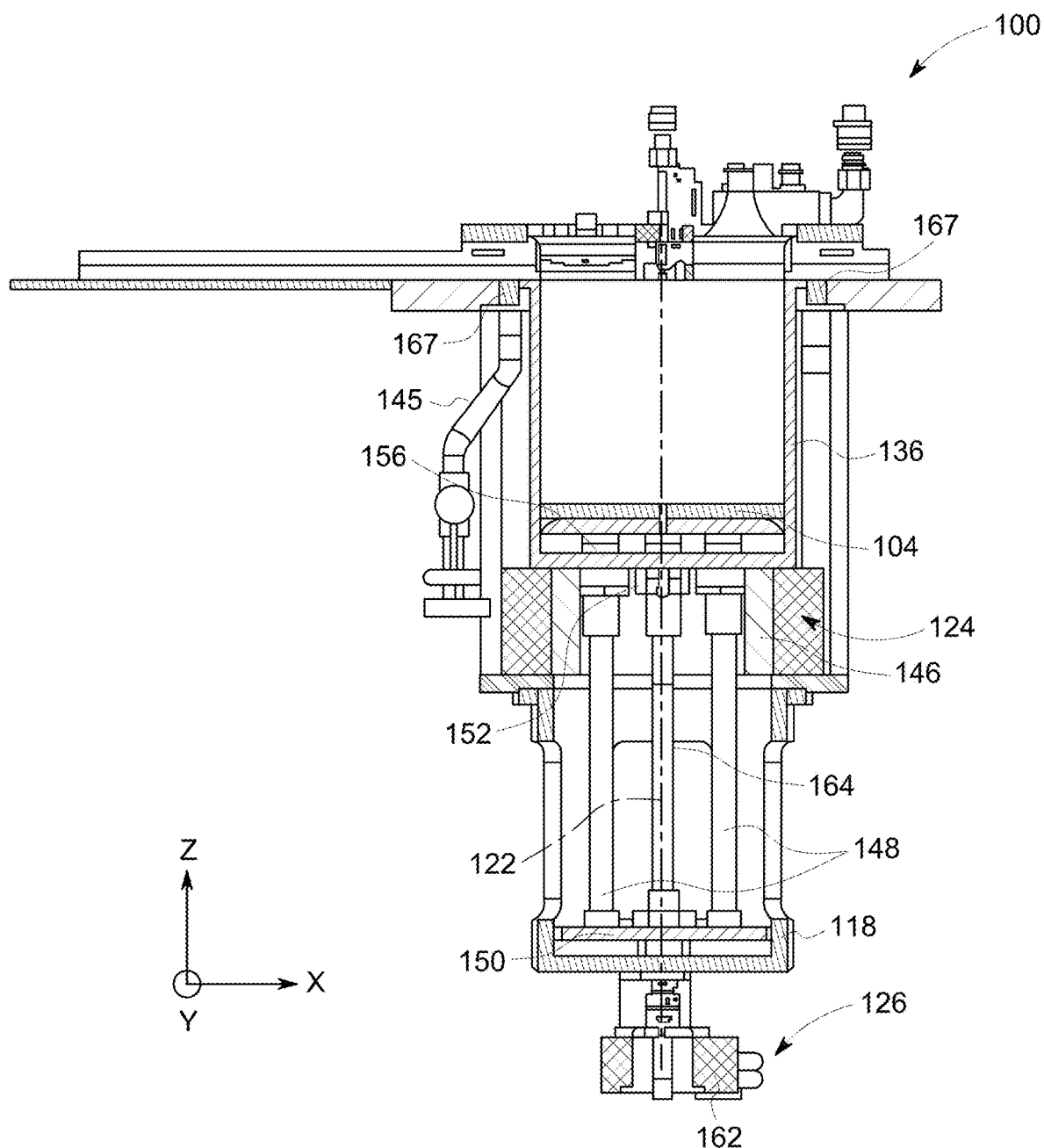
FIG. 7 is a sectional perspective view of a portion of the additive manufacturing system shown in FIGS. 1 and 2 with the rotating build platform in a third position.

FIG. 5 is a sectional view of a portion of additive manufacturing system 100 with build platform 104 in a first position. FIG. 6 is a sectional perspective view of a portion of additive manufacturing system 100 with build platform 104 in a second position. FIG. 7 is a sectional perspective view of a portion of additive manufacturing system 100 with build platform 104 in a third position. In the exemplary embodiment, first actuator assembly 124 is configured to rotate build platform 104 about rotation axis 122 at a first speed. Rotation axis 122 extends through a center of build platform 104. In addition, as described further herein, second actuator assembly 126 is configured to rotate a threaded shaft or screw 164 about rotation axis 122 at a second speed and cause build platform 104 to move linearly along rotation axis 122 due to the difference between first speed and second speed. For example, controller 138 is configured to control operation of first actuator assembly 124 and second actuator assembly 126 to provide a difference between the first speed and the second speed that causes vertical movement of build platform 104 at a desired speed during fabrication of a component. In alternative embodiments, build platform 104 is moved in any manner that enables additive manufacturing system 100 to operate as described herein.

Also, in the exemplary embodiment, build platform 104 is coupled to support structure 118 and wall 136 such that build platform 104 is rotatable wall 136. First actuator assembly 124 includes a rotary actuator 146 configured to rotate build platform 104 and wall 136 about rotation axis 122 at the first speed. In addition, in the exemplary embodiment, additive manufacturing system 100 includes a plurality of elongate rods 148, a support plate 150, and a threaded coupling 152. Rods 148 are coupled to and extend between build platform 104 and support plate 150 such that rods 148 and support plate 150 rotate with build platform 104. Support plate 150 defines a central opening 154 that receives threaded coupling 152. In alternative embodiments, additive manufacturing system 100 includes any support structure 118 that enables additive manufacturing system 100 to operate as described herein.

Also, in the exemplary embodiment, additive manufacturing system 100 includes a container plate 156 coupled to wall 136 and forming a bottom of the build container. Container plate 156 rotates with wall 136 and build platform 104. In addition, container plate 156 defines a plurality of openings 158 that receive guide bearings 160 for rods 148. Container plate 156 and bearings 160 provide support for rods 148 and build platform 104 and allow rods 148 and build platform 104 to move linearly in the Z-direction relative to container plate 156. In addition, build platform 104 is slidingly coupled to wall 136 such that build platform 104 is able to move linearly in the Z-direction relative to wall 136. In alternative embodiments, additive manufacturing system 100 includes any build container that enables additive manufacturing system 100 to operate as described herein. In some embodiments, container plate 156 may be omitted.

In the exemplary embodiment, second actuator assembly 126 includes a rotary actuator 162 coupled to a threaded shaft or screw 164 and configured to rotate shaft 164 about rotation axis 122 at a second speed different from the first speed. Threaded coupling 152 engages threads on shaft 164 and causes linear movement of support plate 150, rods 148, and build platform 104 as shaft 164 rotates relative to support plate 150, rods 148, and build platform 104. Accordingly, threaded shaft 164 acts a lead screw to translate rotational motion into linear motion. In alternative embodiments, additive manufacturing system 100 includes any actuator assembly 124, 126 that enables additive manufacturing system 100 to operate as described herein.

Moreover, in the exemplary embodiment, shaft 164 is supported by a bearing 166 at each end of shaft 164. Bearings 166 facilitate rotation of shaft 164 relative to the build container and allow shaft 164 and build platform 104 to rotate at different speeds. Moreover, shaft 164 includes a threaded portion configured to engage threaded coupling 152 between first and second ends of shaft 164. As a result, a difference in rotational speed between support plate 150 and shaft 164 causes threaded coupling 152 to travel towards the first or second end of shaft 164 along the threaded portion of shaft 164 depending on the direction and speed of rotation of support plate 150 and/or shaft 164. In alternative embodiments, shaft 164 is supported in any manner that enables additive manufacturing system 100 to operate as described herein.

Also, in the exemplary embodiment, additive manufacturing system 100 includes a particulate collection system including a gutter 165 surrounding the rotating build chamber to allow for collection of excess particulate 106 during fabrication of the component. During operation of additive manufacturing system 100, recoater blades 144 direct particulate 106 from the central region of build platform 104 across the top surface of the build chamber. Recoater blades 144 provide a desired thickness and surface characteristics of particulate 106 on build platform 104. Excess particulate 106 may be directed into gutter 165. At least one paddle 167 is positioned within gutter 165 and is configured to rotate with the build chamber. For example, in the exemplary embodiment, additive manufacturing system 100 includes two paddles 167. As the build chamber rotates, paddles 167 direct particulate 106 through gutter 165 into a chute 169 connected to conduit 145. Conduit 145 conveys particulate 106 to hopper 147 (shown in FIG. 2). In alternative embodiments, additive manufacturing system 100 includes any particulate collection system that enables additive manufacturing system 100 to operate as described herein.

Figure 8:
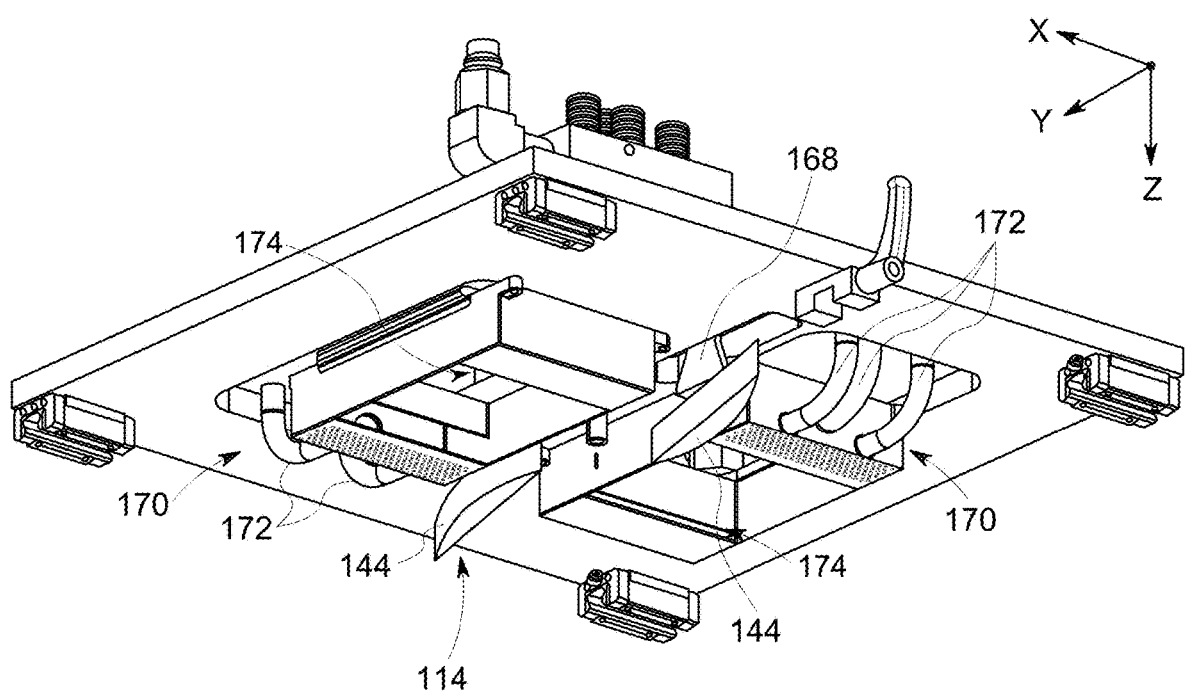
FIG. 8 is lower perspective view of a portion of the additive manufacturing system shown in FIGS. 1 and 2 and including a recoater assembly.

FIG. 8 is a lower perspective view of a portion of additive manufacturing system 100 including recoater assembly 114. Recoater assembly 114 includes a pair of recoater blades 144. Recoater blades 144 are coupled to a support 168 that is configured to maintain recoater blades 144 in a fixed position relative to build platform 104 during operation of additive manufacturing system 100. Each recoater blade 144 is spaced from a center of build platform 104 (shown in FIG. 4) and extends along a chord of build platform. Accordingly, recoater blades 144 are positioned to contact particulate 106 on build platform 104 and on the fabricated component as build platform 104 is lowered. Recoater blades 144 distribute particulate 106 across build platform 104 as build platform 104 is rotated relative to recoater blades 144. In the exemplary embodiment, recoater blades 144 extend along parallel, i.e., non-intersecting, chords of build platform 104. In alternative embodiments, additive manufacturing system 100 includes any recoater assembly 114 that enables additive manufacturing system 100 to operate as described herein. For example, in some embodiments, recoater assembly 114 includes a single recoater blade 144. In further embodiments, recoater assembly 114 includes three or more recoater blades 144. In some embodiments, recoater blades 144 may be straight or any other suitable shape.

In addition, in the exemplary embodiment, additive manufacturing system 100 includes at least one local gas handling system 170. In the exemplary embodiment, additive manufacturing system 100 includes a separate gas handling system 170 for each consolidation area of build platform 104. Each gas handling system 170 is configured to direct a gas across the respective build area of build platform 104. The gas is selected based on the composition of particulate 106. For example, the gas is an inert gas such as nitrogen or argon which does not affect materials such as metal in particulate 106. The gas directs contaminants in the atmosphere including, for example and without limitation, smoke and soot, into a plenum where the contaminants are collected and directed through a filter. Each gas handling system 170 includes at least one gas source 172 and a plenum 174. In alternative embodiments, additive manufacturing system 100 may include any gas handling system 170 that enables additive manufacturing system 100 to operate as described herein.

Figure 9:
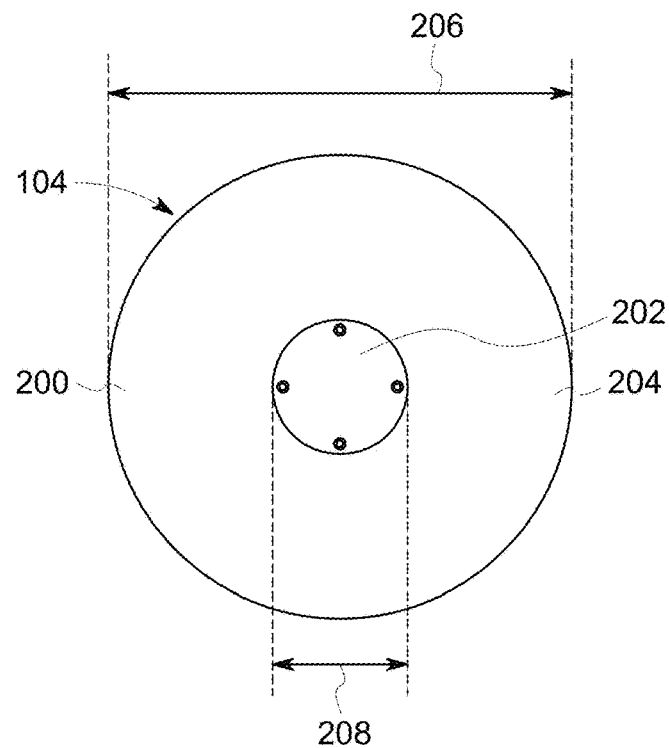
FIG. 9 is a schematic plan view of the rotating build platform of the additive manufacturing system shown in FIGS. 1 and 2.

FIG. 9 is a schematic plan view of build platform 104 of additive manufacturing system 100 (shown in FIGS. 1 and 2). Build platform 104 includes a surface 200 having a central region 202 and an annular peripheral region 204 extending around central region 202. Build platform 104 is configured to rotate about a rotation axis extending through a center of build platform 104. As build platform 104 rotates, annular peripheral region 204 has an annular velocity that is greater than the annular velocity of central region 202. During operation of additive manufacturing system 100 (shown in FIGS. 1 and 2), particulate 106 (shown in FIG. 4) is distributed across build platform and a component on build platform by depositing particulate 106 (shown in FIG. 4) onto central region 202 and directing particulate 106 towards annular peripheral region 204. Accordingly, build platform 104 enables additive manufacturing system 100 (shown in FIGS. 1 and 2) to fabricate a component in a continuous process. For example, recoater assembly 114 (shown in FIG. 4) is configured to direct particulate 106 deposited onto central region 202 of build platform 104 across annular peripheral region 204 while consolidation device 108 consolidates particulate on annular peripheral region 204. Recoater assembly 114 and consolidation device 108 are able to operate simultaneously operate on different portions of build platform 104. As a result, the time required to fabricate components is reduced.

Also, in the exemplary embodiment, build platform 104 is sized to provide one or more build areas for fabricating components. For example, in the exemplary embodiment, build platform 104 accommodates two consolidation devices 108 (shown in FIGS. 1 and 2) of additive manufacturing system 100 (shown in FIGS. 1 and 2). In the exemplary embodiment, build platform 104 is circular and has a diameter 206. In some embodiments, diameter 206 is in a range of about 10 cm to about 200 cm. In alternative embodiments, build platform 104 is any size and shape that enables build platform 104 to function as described herein.

In addition, in the exemplary embodiment, central region 202 is located at the center of build platform 104 and includes less than a third of the surface area of surface 200. Central region 202 is circular and has a diameter 208. In some embodiments, diameter 208 is in a range of about 2 cm to about 180 cm.

Figure 10:
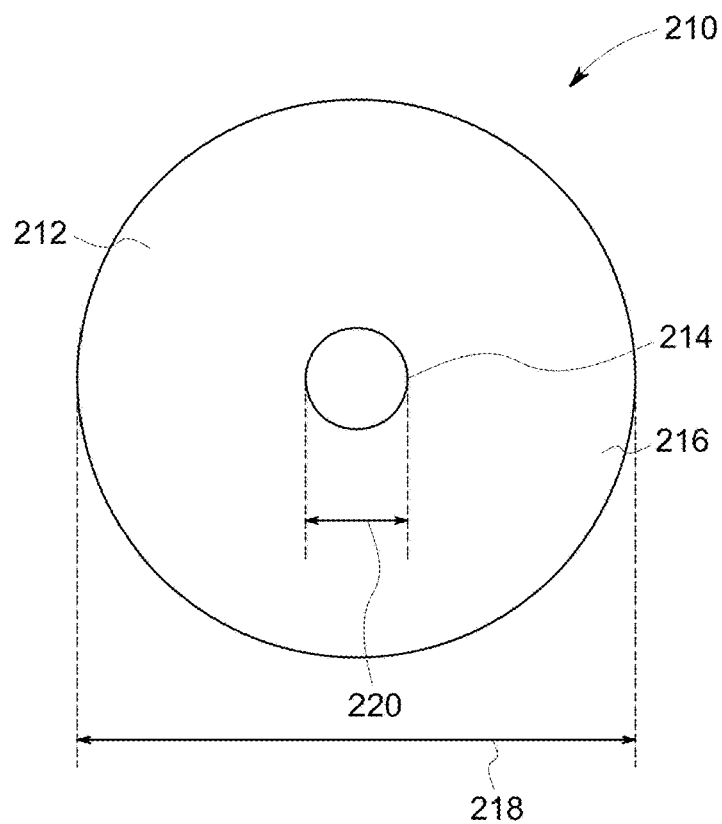
FIG. 10 is a schematic plan view of an alternative embodiment of a build platform.

FIG. 10 is a schematic plan view of an exemplary embodiment of an alternative build platform 210. Build platform 210 may be used with additive manufacturing system 100 (shown in FIGS. 1 and 2). Build platform 210 is similar to build platform 104 (shown in FIG. 9) except build platform 210 is larger than build platform 104. Accordingly, the size of components of additive manufacturing system 100 such as support structure 118 (shown in FIGS. 5-7), recoater assembly 114 (shown in FIG. 4) and housing 102 (shown in FIG. 1) may be increased to accommodate build platform 210. In alternative embodiments, build platform 210 may be used with any additive manufacturing system that enables build platform 210 to function as described herein.

Build platform 210 includes a surface 212 having a central region 214 and an annular peripheral region 216 extending around central region 214. Build platform 210 is configured to rotate about a rotation axis extending through a center of build platform 210. Also, in the exemplary embodiment, build platform 210 is sized to provide one or more build areas for fabricating components. Build platform 210 is circular and has a diameter 218. In some embodiments, diameter 218 is in a range of about 10 cm to about 200 cm. In alternative embodiments, build platform 210 is any size and shape that enables build platform 210 to function as described herein.

In addition, in the exemplary embodiment, central region 214 is located at the center of build platform 210 and includes less than a quarter of the surface area of surface 212. Central region 214 is circular and has a diameter 220. In some embodiments, diameter 220 is in a range of about 2 cm to about 180 cm.

Figure 11:
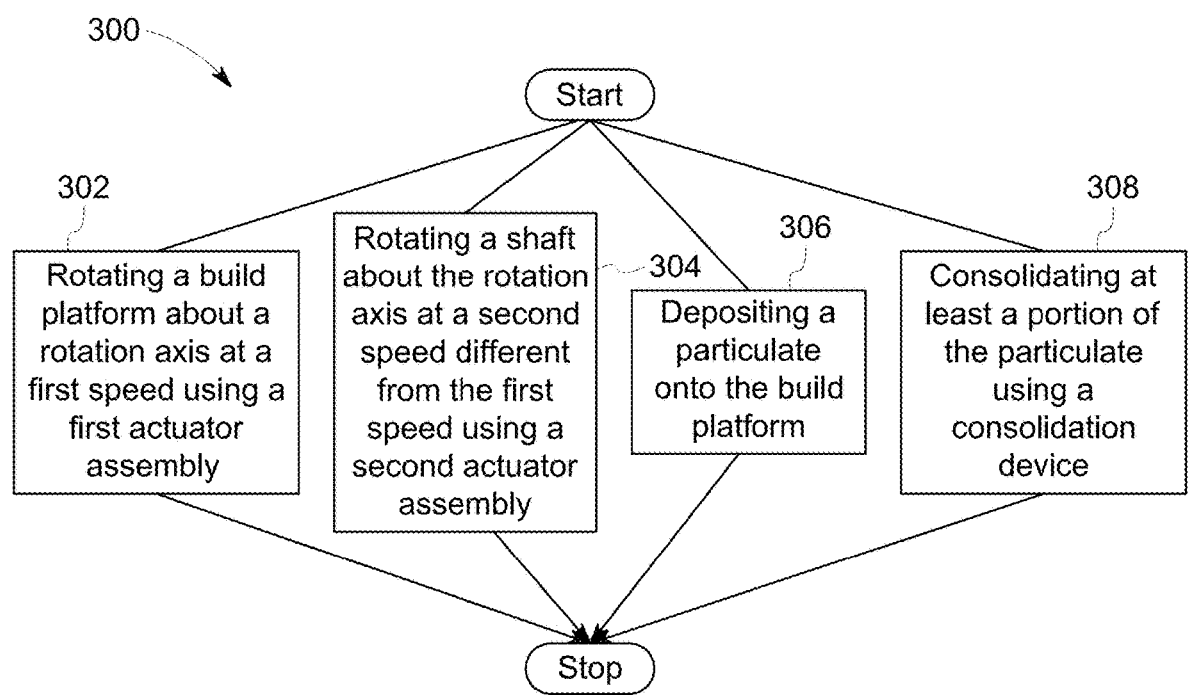
FIG. 11 is a flow chart of an exemplary method of fabricating a component using the additive manufacturing system shown in FIGS. 1 and 2.

FIG. 11 is a flow chart of an exemplary method 300 of fabricating a component using additive manufacturing system 100 (shown in FIG. 1). In reference to FIGS. 1-4 and 10, method 300 generally includes rotating 302 build platform 104 about rotation axis 122 at a first speed using first actuator assembly 124 and rotating 304 shaft 164 about rotation axis 122 at a second speed different from the first speed using second actuator assembly 126. Controller 138 controls the speed difference between shaft 164 and build platform 104 such that build platform 104 moves longitudinally along shaft 164 at a predetermined speed. For example, controller 138 determines a rotational speed of build platform 104 based on operating parameters of additive manufacturing system 100. In addition, controller 138 determines a desired linear speed of build platform 104 based on operating parameters of additive manufacturing system 100. Operating parameters of additive manufacturing system 100 include, for example and without limitation, the configuration of recoater assembly 114, number and types of consolidation devices 108, and size of build platform 104.

In the exemplary embodiment, after determining the desired rotational speed and linear speed of build platform 104, controller 138 determines a rotational speed of shaft 164 that will induce build platform 104 to translate linearly along axis 122 at the desired speed. The difference in rotational speed between build platform 104 and shaft 164 determines the linear speed of build platform 104. In alternative embodiments, the rotations of build platform 104 and shaft 164 are controlled in any manner that enables additive manufacturing system 100 to operate as described herein.

In addition, in the exemplary embodiment, controller 138 coordinates the rotational speeds of build platform 104 and shaft 164 to accommodate local variations in build time requirements. For example, controller 138 determines layers or sections of layers that require more or less build time due to variations in the thickness of angular sectors of the component and controller 138 adjusts the rotation rate of build platform 104 and/or shaft 164 to maintain the sections within the build area for the required time for consolidation device 108 to complete consolidation of each section. In particular, the rotation speed of build platform 104 and shaft 164 relative to consolidation device 108 may be decreased to accommodate relatively thick sections and the rotation speed may be increased to accommodate relative thinner sections and reduce idle time of consolidation device 108.

Also, in the exemplary embodiment, method 300 includes depositing 306 particulate 106 onto build platform 104 of additive manufacturing system 100 and consolidating 308 at least a portion of particulate 106 using consolidation device 108. For example, particulate 106 is released from an outlet of conduit 130 onto the central region of build platform 104 as build platform 104 is rotated at the first speed. Particulate 106 forms a conical shape. In some embodiments, at least one recoater blade 144 contacts particulate 106 on the central region of build platform 104 as build platform 104 rotates to distribute particulate 106 across build platform 104. Accordingly, particulate 106 is distributed across build platform 104 in layers to allow consolidation of particulate 106 layer by layer as build platform 104 is lowered. In further embodiments, consolidation device 108 and recoater assembly 114 operate over different areas of build platform 104 such that consolidation device 108 is able to consolidate 308 particulate 106 at the same time that recoater blade 144 distributes particulate across build platform 104. Accordingly, the time required to fabricate components using additive manufacturing system 100 is reduced. In alternative embodiments, consolidation device 108 and/or recoater assembly 114 are configured in any manner that enables additive manufacturing system 100 to operate as described herein.

The embodiments described herein include an additive manufacturing system including a rotating build platform. The build platform is rotated at a first speed about a rotational axis using a first actuator assembly. The additive manufacturing system further includes a shaft that is rotated about the rotational axis at a second speed different from the first speed using a second actuator assembly. The shaft is coupled to the build platform such that the difference in speed between the build platform and the shaft induces linear movement of the build platform along the rotational axis. In some embodiments, a particulate is deposited onto a central region of the build platform and a recoater assembly contacts the particulate to distribute the particulate across the build platform as the build platform rotates. As a result, the time required to fabricate components using the additive manufacturing system is reduced.

An exemplary technical effect of the methods, systems, and apparatus described herein includes at least one of: a) reducing the time required to fabricate components using an additive manufacturing system, b) providing an additive manufacturing system that requires fewer actuator assemblies to control movement of a rotating build platform in multiple directions than other additive manufacturing systems, c) providing an additive manufacturing system that allows a consolidation device and a recoater assembly to operate simultaneously during fabrication of a component, d) simplifying the mechanisms required to deposit particulate onto the build platform, and e) reducing the cost of additively manufacturing a component.

Exemplary embodiments of additive manufacturing systems are described above in detail. The additive manufacturing systems, and methods of using and manufacturing such systems are not limited to the specific embodiments described herein, but rather, components of systems and/or steps of the methods may be utilized independently and separately from other components and/or steps described herein. For example, the methods may also be used in combination with other additive manufacturing systems, and are not limited to practice with only the additive manufacturing systems, and methods as described herein. Rather, the exemplary embodiment can be implemented and utilized in connection with many other additive manufacturing systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system comprising:
   a build platform configured to receive a particulate;
   a particulate dispenser configured to deposit the particulate onto said build platform;
   a consolidation device configured to consolidate at least a portion of the particulate to form a component;
   a first actuator assembly configured to rotate said build platform about a rotation axis at a first speed, the rotation axis extending through a center of said build platform;
   a second actuator assembly comprising an actuator and a shaft extending along the rotation axis, wherein said actuator is configured to rotate said shaft about the rotation axis at a second speed different from the first speed, and wherein said shaft is coupled to said build platform and configured to translate said build platform along the rotation axis upon rotation of said shaft; and
   a particulate collection system, the particulate collection system comprising a gutter and at least one paddle, wherein the gutter surrounds a circumference of the build platform, and the gutter comprises opposed side walls, and
   wherein the at least one paddle is positioned in the gutter between the opposed side walls, and the at least one paddle is configured to rotate with the build platform.

2. The additive manufacturing system in accordance with claim 1, wherein said shaft comprises a first end, a second end, and a threaded portion extending between said first end and said second end, and wherein said shaft is supported at said first end and said second end by a bearing such that said shaft is rotatable relative to said build platform.

3. The additive manufacturing system in accordance with claim 2, wherein said threaded portion of said shaft is configured to engage a threaded coupling coupled to said build platform such that rotation of said shaft relative to said build platform causes said threaded coupling to move longitudinally along said shaft.

4. The additive manufacturing system in accordance with claim 1, further comprising at least one recoater blade positioned adjacent said build platform, wherein said recoater blade is fixed in position during rotation of said build platform and is configured to contact the particulate deposited on said build platform.

5. The additive manufacturing system in accordance with claim 1, wherein said build platform is circular, and wherein said additive manufacturing system further comprises a cylindrical wall extending around said build platform to define a build container and at least one support coupled to said build platform, wherein said first actuator assembly comprises a rotary actuator configured to rotate said build platform, said at least one support, and said cylindrical wall about the rotation axis at the first speed.

6. The additive manufacturing system in accordance with claim 5, wherein said shaft is coupled to said at least one support by a threaded coupling such that rotation of said shaft relative to said at least one support causes said at least one support to move longitudinally along said shaft.

7. The additive manufacturing system in accordance with claim 6, wherein said at least one support comprises a plate and a plurality of elongate members coupled to and extending between said plate and said build platform, and wherein said threaded coupling extends through a center of said plate.

8. The additive manufacturing system in accordance with claim 1 further comprising a gas handling system configured to direct a gas across a build area of said build platform, said gas handling system comprising a gas source and a plenum.

9. The additive manufacturing system in accordance with claim 1 further comprising a controller configured to control operation of said first actuator assembly and said second actuator assembly to cause translation of said build platform at a predetermined speed based on a difference between the first speed and the second speed.

10. The additive manufacturing system in accordance with claim 1, wherein said particulate collection system further comprises a hopper, and a conduit coupling said gutter and said hopper together such that the particulate is allowed to flow from said gutter into said hopper.

11. The additive manufacturing system in accordance with claim 10, wherein the conduit comprises a chute, and wherein as the at least one paddle rotates with said build platform, the at least one paddle directs particulate from the gutter into the chute.

12. The additive manufacturing system in accordance with claim 1, wherein the additive manufacturing system is configured to perform a method of fabricating a component, said method comprising:
   rotating the build platform about the rotation axis at the first speed using the first actuator assembly, the rotation axis extending through the center of the build platform;
   rotating the shaft about the rotation axis at the second speed different from the first speed using the second actuator assembly, wherein the shaft extends along the rotation axis and is coupled to the build platform to translate the build platform along the rotation axis upon rotation of the shaft;
   depositing the particulate onto the build platform;
   collecting the particulate from the build platform within the gutter surrounding the circumference of the build platform, the at least one paddle positioned in the gutter and the at least one paddle rotating with the build platform to move the particulate within the gutter;
   consolidating at least a portion of the particulate on the build platform using the consolidation device; and
   adjusting at least one of the first speed and the second speed based on a characteristic of the component and an operating parameter of the consolidation device.

13. The additive manufacturing system in accordance with claim 12, wherein depositing the particulate onto the build platform comprises depositing the particulate onto a central region of the build platform as the build platform is rotated at the first speed.

14. The additive manufacturing system in accordance with claim 13, wherein the method further comprises:
contacting the particulate on the central region of the build platform using at least one recoater blade positioned adjacent the build platform as the build platform is rotated at the first speed.

15. The additive manufacturing system in accordance with claim 12, wherein the method further comprises:
regulating flow of the particulate from a hopper and through a conduit coupled to an outlet of the hopper, wherein depositing the particulate onto the build platform comprises releasing the particulate from an outlet of the conduit.

16. An additive manufacturing system comprising:
a build platform configured to receive a particulate;
a particulate dispenser configured to deposit the particulate onto a central region of said build platform;
a first actuator assembly configured to rotate said build platform about a rotation axis at a first speed, the rotation axis extending through a center of said build platform;
a second actuator assembly comprising an actuator and a shaft extending along the rotation axis, wherein said actuator is configured to rotate said shaft about the rotation axis at a second speed different from the first speed, and wherein said shaft is coupled to said build platform and configured to translate said build platform along the rotation axis upon rotation of said shaft;
at least one recoater blade positioned adjacent said build platform, wherein said at least one recoater blade is fixed in position during rotation of said build platform and is configured to contact the particulate deposited on the central region of said build platform and to distribute the particulate across said build platform;
at least one consolidation device configured to consolidate at least a portion of the particulate to form a component as said at least one recoater blade distributes the particulate; and
a particulate collection system, the particulate collection system comprising a gutter and at least one paddle,
wherein the gutter surrounds a circumference of the build platform, and the gutter comprises opposed side walls, and
wherein the at least one paddle is positioned in the gutter between the opposed side walls, and the at least one paddle is configured to rotate with the build platform.

17. The additive manufacturing system in accordance with claim 16, wherein said build platform is circular, and wherein said at least one recoater blade extends along a chord of said build platform.

18. The additive manufacturing system in accordance with claim 17, wherein said at least one recoater blade comprises a pair of recoater blades extending along non-intersecting chords of said build platform.

19. The additive manufacturing system in accordance with claim 16, wherein said particulate dispenser is configured to dispense the particulate in a conical shape on the central region of said build platform, and wherein said at least one recoater blade is positioned to contact the particulate at a base of the conical shape and distribute the particulate across said build platform.

20. The additive manufacturing system in accordance with claim 16, wherein the particulate collection system further comprises a hopper, and a conduit coupling the gutter and the hopper together to allow particulate flow from the gutter into the hopper.

* * * * *